June 21, 1960  D. J. MYNALL  2,942,212
POSITION SENSING DEVICES
Filed Jan. 29, 1957  2 Sheets-Sheet 1
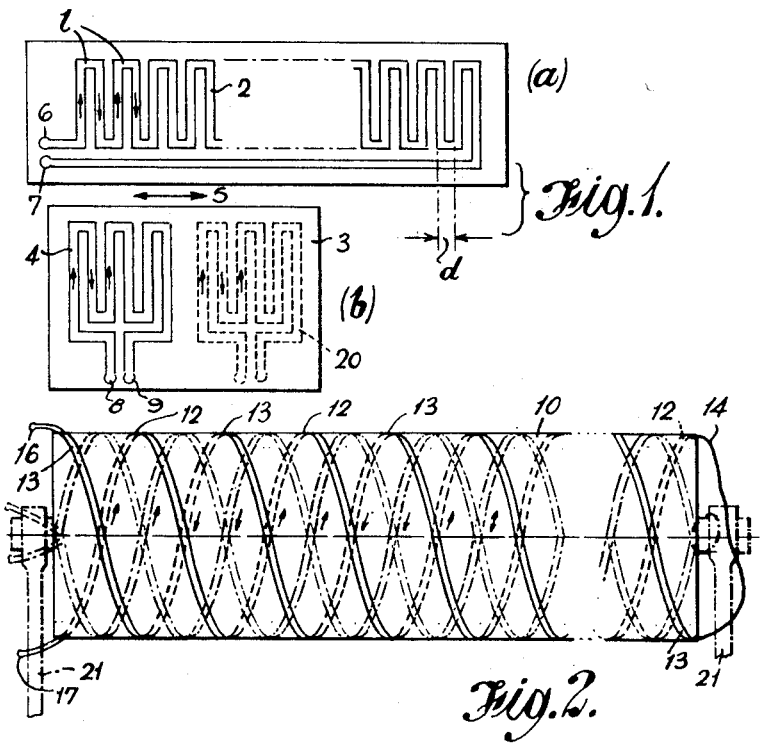
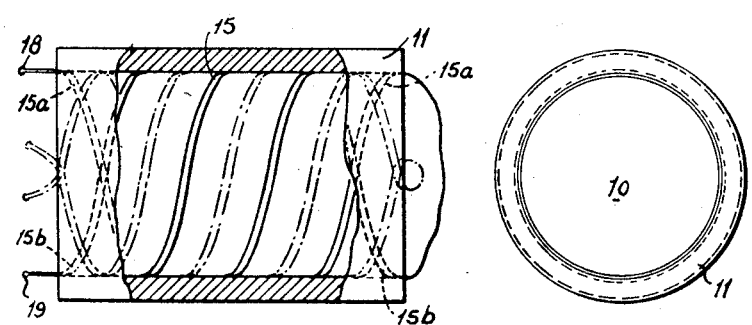
INVENTOR
DENNIS JAMES MYNALL
BY
ATTORNEY June 21, 1960 D. J. MYNALL 2,942,212
POSITION SENSING DEVICES
Filed Jan. 29, 1957 2 Sheets-Sheet 2

INVENTOR
DENNIS JAMES MYNALL
ATTORNEY

United States Patent Office 2,942,212
Patented June 21, 1960

2,942,212

POSITION SENSING DEVICES

Dennis James Mynall, Rugby, England, assignor to The British Thomson-Houston Company Limited, London, England, a British company Filed Jan. 29, 1957, Ser. No. 636,949

Claims priority, application Great Britain Jan. 31, 1956

5 Claims. (Cl. 336—30)

This invention relates to position sensing devices as used for sensing or detecting the instantaneous relative positions of two relatively movable parts, and has an important application in connection with the determination and/or control of the positioning of relatively movable parts of a machine tool.

Devices for sensing relative angular position are known comprising on each of two relatively rotatable members one or more electrical windings the magnetic axes of which extend transversely of the axis of rotation so that the mutual inductance between windings on the respective members varies cyclically with angular displacement, devices of this nature having been given names such as selsyn, magslip, autosyn and so on. According to the use for which it is intended, such a device may, for example, comprise two or more windings carried by one of its two members and one or more windings carried by its other member, the windings on the first member being regularly disposed about the axis of rotation so that cyclic variations of the mutual inductance of these windings with respect to any one winding on the second member consequent upon relative angular movement are similar in form but of different phase. Thus in a typical example in which one member has a pair of windings arranged in space quadrature and cooperating with a single winding on the other member, graphs of the variation of mutual inductance between the single winding and each of the other two windings would, as plotted to a suitable origin against relative angular displacement, take the form of sine and cosine curves respectively.

Such known devices can be used for precise electrical control or indication of angular position. Should a mechanical displacement for which electrical indication or control is required be rectilinear rather than rotational, these known devices can still be used if the rectilinear movement is first converted to rotation, as by means of a rack and pinion for example. In the interests of precision, however, it may be undesirable to introduce such mechanical transformation. In order, therefore, to obtain a similar variation of mutual inductance with displacement directly from a relative linear movement, position sensing devices have been proposed comprising two linearly relatively movable members each provided on a planar surface thereof with a regular, cyclically repeating sinuous pattern of electrically conductive material, the patterned surfaces of the two members lying close to but spaced from each other and parallel to the direction of the relative movement. The pattern on one of these members is long enough (in the direction of the relative movement) to cater for the maximum extent of relative displacement that can occur. The path on the other member has the same "pitch" as that on the first member, that is the sinuous form of the pattern makes the same number of transverse excursions per unit length of the member, but would usually have a comparatively short length and may also be narrower or broader.

With electrical connection made to each pattern at its opposite ends relative movement of the two members will produce between the two patterns a cyclic variation of mutual inductance which with proper design can closely approach sinusoidal, going through one cycle of variation for a relative movement of the members equal to the span of one cycle of the pattern. If desired there may be added to the shorter of the two members, at one or each end of the pattern thereon, a further similar but separate pattern located so that its coupling with the pattern on the other member is in phase quadrature, thus giving a sine-cosine system as described above for a rotary sensing device.

The operation of this known form of linear position sensing device depends essentially on the magnetic coupling between the transversely extending portions of the sinuous conductive patterns. The longitudinally extending portions of the patterns, that is, the portions that afford interconnection in each pattern between successive transverse portions, give rise to a certain amount of undesirable coupling, and to minimise this it has been suggested to offset these longitudinal portions in the two patterns either by making the patterns of dissimilar width or by offsetting them as a whole with respect to each other.

It would be advantageous, however, to have an arrangement in which such lengthwise portions giving rise to this undesirable coupling were to a large extent eliminated, and with this in view the present invention provides a position sensing device comprising a first member having a peripheral surface (which may face inwardly or outwardly) provided with a pair of continuous, electrically conductive paths passing round and progressing along the member in a mutually interlaced manner analogous to that of a two-start helix round a cylindrical surface, these paths being electrically interconnected at one end, together with a second member arranged for relative movement with respect to the first in the direction along the latter and defining a surface facing and substantially conforming to said surface of the first member over at least a portion of the periphery thereof, which second member is provided with a continuous conductive path at least portions of which, located on said surface of the second member and substantially conforming in shape and spacing to corresponding portions from adjacent turns in the paths on the first member, are disposed in mutually inductive relationship with the paths on the first member and are electrically related in their own path in such manner that current flow through the path would be in opposite peripheral senses in adjacent ones of said portions thereof, the arrangement being such that with electrical connection made to the free ends of the paths on the first member and to the ends of the path on the second member, relative movement between the two members in said direction will produce cyclical variation of the mutual inductance.

In further considering the invention, its advantages and its mode of operation, reference will be made to the accompanying, somewhat schematic drawings in which:

Fig. 1 illustrates at (a) and (b) respectively the cooperating members of a known form of position sensing device;

Figs. 2 and 3 respectively illustrate possible forms of the first and second members, as above identified, of a position sensing device according to the invention, the second member being annular and being shown partly broken away with the first member removed;

Fig. 3a is an end view showing the operational relationship between the two members shown separately in Figs. 2 and 3;

Figure 4A:
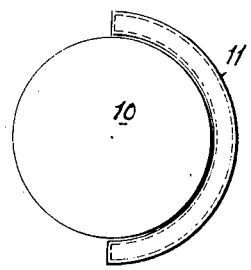
Fig. 4a is an end view showing the operational relationship of such semi-annular form of second member with the first member.
Figure 4:
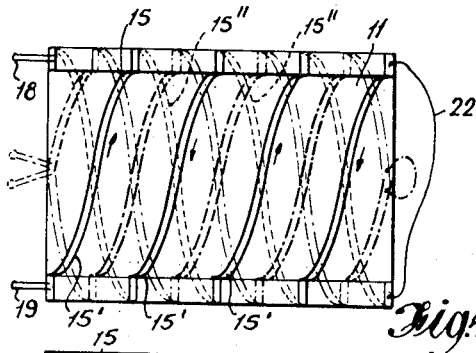
Figs. 4 and 5 illustrate other, semi-annular forms for the second member of the device.

Referring to Fig. 1, the known form of position sensing device comprises a first planar member 1 carrying a regular, sinuous surface pattern 2 of a conductive nature, and a second planar member 3 carrying a similar, but shorter conductive surface pattern 4. In use, the two members 1 and 3 are arranged face to face (not shown) with their respective conductive patterns 2 and 4 closely spaced so as to be in mutually inductive relationship. The two members are arranged for relative longitudinal movement with respect to each other (as indicated by the double headed arrow 5), and the length of the pattern 2 on the first member 1 is made commensurate with the maximum extent of relative longitudinal movement between the two members. With electrical connection made to each pattern at its opposite ends, namely to the terminals 6 and 7 for the pattern 2 and to the terminals 8 and 9 for the pattern 4, relative longitudinal movement between the two members 1 and 3 will produce a cyclic variation of mutual inductance between the patterns as previously explained. A relative movement of the members equal to twice the distance $d$ between adjacent transverse portions $t$ of the patterns will produce a complete cycle of variation of the mutual inductance, so that the mutual inductance at any time will represent the relative positioning of the two members at that time within a span equal to the distance $d$.

The operation of the known form of device depends essentially on the mutual inductive coupling between the transversely extending portions $t$ of the patterns. As previously indicated, the longitudinal portions such as $l$ of the patterns give rise to a certain amount of undesirable coupling tending to reduce accuracy, though this adverse effect may be reduced by making the patterns of dissimilar widths as indicated in Fig. 1.

Figure 5:
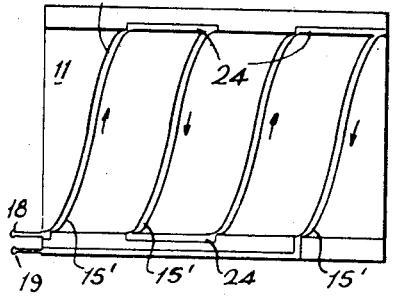

Referring now to Figs. 2–5, a position sensing device embodying the invention may comprise a cylindrcal first member 10 (Fig. 2) and an annular (Fig. 3) or arcuate (Fig. 4 or 5) second member 11 which in use is positioned to embrace the member 10 with a small clearance between them. This positional relationship is shown in Fig. 3a for an annular second member and Fig. 4a for an arcuate second member. The first member 10 is provided on its cylindrical surface with two interlaced electrically conductive helical paths 12 and 13 connected together at one end, as by a wire 14, so that current flow in series through these paths would be in one sense round the member in one path and in the opposite sense round the member in the other path as indicated by the arrows in Fig. 2; that is, owing to the interlacing of the paths 12 and 13 adjacent turns taken alternately from the two paths will carry current in opposite senses round the member 10. The second member 11 is provided with a continuous conductive path 15 which in Fig. 3 is constituted by similarly end-connected and interlaced helical paths 15a, 15b on the inner surface of the member 11, and in Figs. 4 and 5 includes on the inner surface of the member 11 portions 15' conforming to corresponding portions of adjacent turns in the paths 12 and 13 of the member 10, these path portions 15', which are thus of part helical form and have the same spacing as adjacent turns on the member 10, being electrically related in their path 15 in such manner that current flow through the path would pass in one peripheral sense through one portion and in the opposite peripheral sense through the adjacent portions, as indicated by the arrows. Thus in the form illustrated in Fig. 4 for the member 11, the path portions 15' are connected by sections 15" of the path 15 which extend from one end of each portion 15', namely where the path reaches a peripheral limit of the surface, over the rear of the member 11 to the opposite end of the next but one portion 15', which sections 15" thereby connect the portions 15' effectively into two interlaced paths which are interconnected at one end by a connection 22 to provide a single continuous path. On the other hand, in the form illustrated in Fig. 5 for the member 11, the path 15 is completed simply by interconnecting one end of each of the portions 15' with the adjacent end of the next portion on one side, and the other end of such portion 15' with the adjacent end of the portion 15' on the other side, thus providing, as seen in Fig. 5, a sinuous path recurrently traversing the facing surface of the member 11. In the annular form of second member shown in Fig. 3 current flow through the paths 15a and 15b would, as described for the paths 12 and 13 on member 10, be in opposite directions in adjacent turns, again as indicated by the arrows.

In using the position sensing device the members 10 and 11 occupy the positional relationship illustrated in Fig. 3a or Fig. 4a as the case may be (in which relationship an inductive coupling exists between the paths 12 and 13 on the member 10 and the path 15 on the member 11) and are arranged for relative longitudinal movement, that is, lengthwise of the axis of the cylindrical member 10. Electrical connections (not shown) are made to terminals 16 and 17 provided for the free ends of the paths 12 and 13 on member 10, and to terminals 18 and 19 provided for opposite ends of the path 15 on the member 11.

As relative longitudinal movement takes place between the members 10 and 11, a cylical variation of the mutual inductance between the series connected paths 12 and 13 and the path 15 will be obtained. This cyclical variation of mutual inductance results from the facts that any current flow through the two paths 12 and 13 on the member 10 would be in opposite directions in adjacent turns and that current flow through the path 15 on the member 11 would also be in opposite directions in adjacent turns, or in adjacent portions 15', as the case may be. Thus considering any one turn or any one path portion 15' on the member 11, the inductive coupling between it and the paths 12 and 13 on the member 10 will vary progressively from a maximum in one sense to a maximum in the opposite sense and back to a maximum in the first sense as relative movement between the two members moves the turn or portion being considered past successive turns (alternately from one path and the other) of the paths 12 and 13 on the member 10.

Owing to the helical form of these paths 12 and 13, they include no conductive portions extending lengthwise of the direction of movement as is the case with the sinuous path form used in the known position sensing device of Fig. 1, except in so far as such portions may be required for permitting electrical connection to and the interconnection of the paths. Consequently the undesirable coupling arising from the presence of such portions is to a large extent eliminated in a device according to the present invention. If the form shown in Fig. 4 for the member 11 of the device is used, there may be some opposing coupling between the conductive sections 15" passing over the rear of the member 11 and the conductive paths 12 and 13 on the member 10. The consequent loss of effective coupling may, however, be made insignificant in relation to the loss of coupling due to the member 11 not completely surrounding the member 10. With the form of member 11 shown in Fig. 5, the path 15 includes conductive sections 24 (between each portion and the next) which extend lengthwise of the member 10 and thus of the direction of relative movement. Since, however, there are no corresponding sections in the conductive paths 12 and 13 on the member 10, the extent of undesirable coupling introduced may be negligible.

Where practicable, it is preferred to use an annular form of member 11 such as that shown in Fig. 3, since then the full peripheral length of the turns in the paths 12 and 13 on the member 10 is used in providing coupling between these paths and the path 15 on the member 11. With the member 11 completely surrounding the member 10 however, the latter could be supported only adjacent its ends. Should it be desired to avoid this limitation, there may be used instead, for the member 11, an arcuate, preferably semi-annular, form such as that of Fig. 4 or Fig. 5.

Where it is desired, in the known linear position sensing devices such as that of Fig. 1, to provide a second conductive pattern on a member in order to obtain separate variations of mutual inductance having, say, a sine-cosine relationship, this additional pattern must be on a physically distinct section of the member concerned since it is necessary to avoid intersection of the additional pattern with the existing one on the same member and they therefore cannot conviniently be overlapped; such an additional pattern 20 has been indicated in dotted lines in Fig. 1(b). With a device according to the present invention employing as its second member 11 one having its conductive path 15 constituted by a pair of end-connected interlaced paths as in the forms of member 11 shown in Figs. 3 and 4, a similar purpose can be served by providing on the second member a similar end-connected pair of paths interlaced with each other and with the first pair as indicated in chain dotted lines at 23 in Figs. 3 and 4. This leads to a more compact arrangement and may also offer better accuracy than the offset arrangement since the two pairs of paths then cooperate with the same portions of the paths on the first member.

Additionally or alternatively, and for the same purpose, a second pair of helical end-connected paths interlaced with each other and with the first pair 12 and 13 may be provided on the member 10, this having been indicated in chain dotted lines in Fig. 2.

The form of member 11 illustrated in Fig. 5, having a sinuous path, does not permit of the provision thereon of a second, interlaced path: however, the form of Fig. 5 is simpler to produce than the others and may be used where a sine-cosine or other such system is not required or can be provided either by an additional pair of paths on the first member or by providing a second path on the second member axially offset from the first path in the same manner as the path indicated at 22 in Fig. 1b.

In the embodiment illustrated the first member 10 of the sensing device has been shown as being rectilinear with its peripheral surface cylindrical, so that its conductive paths 12 and 13 are helical and thereby define a two-start helix the axis of which is parallel to the direction of relative movement (linear) between the two members. It is also possible, however, for the first member to have some other cross-section such for instance as oval or even rectangular. Moreover it is contemplated that a device in accordance with the present invention could be employed for sensing angular displacement, rather than linear displacement if the first member, such as 10, instead of being rectilinear were made curved, or in the limit annular. In all cases the shape of the second member 11 of the device would be adapted to suit that chosen for the first member.

An advantage of the first member being rectilinear and cylindrical is that by arranging the two members such as 10 and 11 for relative angular rotation about the cylinder axis as well as for relative linear movement along the axis (for instance by optionally providing coaxial bearings for the member 10 as indicated by the dotted representation 21 in Fig. 1), the device becomes capable of responding also to angular displacement. This may be useful for instance in controlling small rectilinear movements from relatively large angular movements, or in applying corrections or deliberate distortions to the law linking the variation of mutual inductance with linear displacement by introducing a predetermined extent of rotary motion derived from the linear motion as by cam control or other means (not shown). With the members thus arranged for relative rotation about the cylinder axis, which is also the axis for the helical paths on the first member, one complete revolution will take the mutual inductance through the same cycle of variation as a relative linear movement (along the axis) equal to the spacing between successive turns of one and the same path on the first member.

Whereas a device conforming to the invention has been illustrated as having its first member 10 of cylindrical form with its conductive paths on its outside surface, it is to be understood that the first member of the device could have a hollow form with its conductive paths provided on its inside peripheral surface. The second member of the device would then be accommodated within the first member and be provided with its conductive path (corresponding to 15) on an outwardly facing surface.

In carrying out the invention the two members of the position sensing device may be of insulating material or, in order to enhance the magnetic coupling or to provide magnetic screening, may contain or consist of suitable ferromagnetic material, the conductive paths then being insulated from such material as may be required. The conductive paths may be provided on the members in any convenient way. For instance they may be "printed" on the members or take the form of conductive strips suitably wrapped round them. Yet again the surfaces may be grooved in accordance with the desired form of the paths and conductors laid therein, in which case the conductors may, if desired, be embedded in material filling up the grooves thereby to provide a smooth surface on the member concerned. All these possibilities are to be considered as coming within the scope of the appended claims.

In employing a device in accordance with the invention for providing electrical indication and/or control of the relative positions of, say, two relatively rectilinearly movable parts of a machine tool, the first member 10 of the device, being rectilinear and having a length at least great enough to allow maximum relative displacement between the machine tool parts without losing the inductive coupling between the members of the device, would be attached to one of the parts with its axis parallel to the direction of movement, while the second member 11 would be attached or mechanically coupled to the other part in such position as to ensure the required mutual inductive coupling between the conductive paths on the members throughout the relative movement of the machine tool parts.

Since the mutual inductance would go through several cycles of variation in a total travel of the machine tool parts, some form of coarse indication or control may have to be provided to determine when the relative positions of the parts lay within a particular range, the device of the invention when determining more precisely the relative positions of the parts within that range. It will be appreciated however, from analogy with selsyn systems, that where the indication or control is continuous no such coarse indication or control may be necessary.

What I claim is:

1. A position sensing device comprising a first member having a circumferential surface provided with a pair of continuous electrically conductive paths passing around and progressing along said first member in a mutually interlaced member analogous to that of a two-start helix around a cylindrical surface, said paths being electrically interconnected at one end, a second member arranged for relative longitudinal movement with respect to said first member and defining a surface which faces and substantially conforms to said surface of the first member over only a portion of the circumference thereof, said second member also being provided with a pair of continuous interconnected conductive paths having interlaced portions which are located on said surface of the second member and substantially conform in shape and spacing to corresponding portions of adjacent turns in said paths on said first member and are disposed in mutually inductive relationship with said paths on said first member and serially interconnected to form said second member paths by connections taken over the rear of said second member between one end of each said latter path portion and the opposite end of the next but one portion, and said two second member paths being themselves interconnected at one end.

2. A position sensing device as claimed in claim 1 wherein said first member, in addition to its said pair of conductive paths, is provided on its said surface with a second pair of end-connected paths similar to said first pair of paths and interlaced with each other and with the first pair.

3. A position sensing device as claimed in claim 1 wherein said surface of said second member, in addition to its said pair of conductive paths, is provided on its said surface with a second pair of end-connected paths similar to its first mentioned pair of paths and interlaced with each other and with the first pair.

4. A position sensing device comprising a first cylindrical member carrying a pair of continuous electrically conductive interlaced helical paths electrically interconnected at one end, a second partly cylindrical member partly embracing said first member and having conductive path portions which are disposed in mutually inductive relationship with and conform in shape and spacing to corresponding portions of adjacent turns of said helical paths on said first member, said path portions on said second member being serially interconnected into a pair of interlaced paths by connections taken over the outside of said second member from one end of each such path portion to the opposite end of the next but one portion, and said two second member paths being interconnected at one end.

5. A position sensing device comprising a first member having an outer cylindrical surface and a pair of continuous electrically conductive interlaced helical paths printed thereon and electrically interconnected at one end, a second member partly embracing said first member and having a part cylindrical surface which faces said first member, conductive path portions printed on said second member and disposed in mutually inductive relationship with and conforming in shape and spacing to corresponding portions of adjacent turns of said helical paths on said first member, said printed path portions on said second member being serially interconnected into a pair of interlaced paths by connections taken over the back of said second member from one end of each such path portion to the opposite end of the next but one portion, and said two second member paths being themselves interconnected at one end.

References Cited in the file of this patent

UNITED STATES PATENTS

| | | |
|---|---|---|
| 2,650,352 | Childs | Aug. 25, 1953 |
| 2,671,892 | Childs | Mar. 9, 1954 |
| 2,769,969 | Comstock | Nov. 6, 1956 |
| 2,836,803 | White | May 27, 1958 |